United States Patent
Feraud

(10) Patent No.: US 10,504,109 B2
(45) Date of Patent: Dec. 10, 2019

(54) METHOD FOR THE MUTUAL AUTHENTICATION OF ENTITIES HAVING PREVIOUSLY INITIATED AN ONLINE TRANSACTION

(71) Applicant: IDEMIA FRANCE, Colombes (FR)

(72) Inventor: Alban Feraud, Nanterre (FR)

(73) Assignee: IDEMIA FRANCE, Colombes (FR)

( * ) Notice: Subject to any disclaimer, the term of this patent is extended or adjusted under 35 U.S.C. 154(b) by 1291 days.

(21) Appl. No.: 14/361,299

(22) PCT Filed: Nov. 20, 2012

(86) PCT No.: PCT/FR2012/052678
§ 371 (c)(1),
(2) Date: Sep. 12, 2014

(87) PCT Pub. No.: WO2013/079848
PCT Pub. Date: Jun. 6, 2013

(65) Prior Publication Data
US 2015/0052063 A1 Feb. 19, 2015

(30) Foreign Application Priority Data
Nov. 29, 2011 (FR) ..................................... 11 60891

(51) Int. Cl.
*G06Q 20/38* (2012.01)
*G06Q 20/32* (2012.01)

(52) U.S. Cl.
CPC ..... *G06Q 20/38215* (2013.01); *G06Q 20/322* (2013.01); *G06Q 20/3829* (2013.01); *G06Q 2220/00* (2013.01)

(58) Field of Classification Search
CPC ........... G06Q 20/38215; G06Q 20/322; G06Q 20/3829; G06Q 2220/00
(Continued)

(56) References Cited

U.S. PATENT DOCUMENTS

2002/0111837 A1 8/2002 Aupperle
2006/0074768 A1 4/2006 Horton
(Continued)

FOREIGN PATENT DOCUMENTS

EP 1296257 3/2003
EP 2204765 7/2010

OTHER PUBLICATIONS

Auth. Officer Olivier Billet. International Search Report dated Mar. 7, 2013 from International Application No. PCT/FR2012/052678 filed Nov. 20, 2012, pp. 1-5.
(Continued)

*Primary Examiner* — James D Nigh
(74) *Attorney, Agent, or Firm* — MH2 Technology Law Group, LLP

(57) ABSTRACT

Methods and devices for enabling authentication may include a first stage in which a first electronic device of the first entity communicates with a second electronic device of the second entity via a telecommunications network. During the first stage, the first electronic device generates a first token and transmits it from the first electronic device to the second electronic device via the network; and the second electronic device generates a third token and transmits the third token to the first electronic device via the network. During a second stage, authenticating a first non-authenticated entity as being the second entity as a function of a second token contained in a first portable electronic device of the first non-authenticated entity occurs; and authenticating a non-authenticated entity as being the first entity as a function of a fourth token contained in a second portable electronic device of the second non-authenticated entity also occurs.

15 Claims, 2 Drawing Sheets

(58) Field of Classification Search
USPC .......................................................... 705/71
See application file for complete search history.

(56) References Cited

U.S. PATENT DOCUMENTS

| | | |
|---|---|---|
| 2006/0122852 A1 | 6/2006 | Moudy |
| 2011/0119190 A1* | 5/2011 | Mina ..................... G06Q 20/12 |
| | | 705/44 |
| 2012/0328101 A1* | 12/2012 | Lakshminarayanan ..................... |
| | | H04L 63/0823 |
| | | 380/258 |
| 2013/0254396 A1* | 9/2013 | Robertson ............... H04L 41/50 |
| | | 709/225 |

OTHER PUBLICATIONS

Mizuno, Shintaro et al. Authentication Using Multiple Communication Channels. Proceedings of the 2005 Workshop on Digital Identity Management, Nov. 11, 2005, pp. 54-62.

Janson, Philippe et al. Scalability and Flexibility in Authentication Services: The KryptoKnight Approach. Proceedings of the Sixteenth Annual Joint Conference of the IEEE Computer and Communications Societies, Japan, Apr. 7, 1997, vol. 2, pp. 725-736.

Chen, Hung-Ming et al. An Efficient and Secure Dynamic ID-based Authentication Scheme for Telecare Medical Information Systems. Journal of Medical Systems, Jun. 7, 2012, vol. 36, No. 6, pp. 3907-3915.

Oh, Byeong-Thaek et al. A Peer Mutual Authentication Method using PKI on Super Peer based Peer-to-Peer Systems. 10th International Conference on Advanced Communication Technology. Feb. 17, 2008, pp. 2221-2225.

Menezes, A. et al. Chapter 10: Identification and Entity Authentication ED. Handbook of Applied Cryptography, Oct. 1, 1996, pp. 385-424, CRC Press, Boca Raton, FL.

Madlmayr, Gerald et al. Secure Communication between Web Browsers and NFC Targets by the Example of an e-Ticketing System. E-Commerce and Web Technologies, Sep. 3, 2008, pp. 1-10.

* cited by examiner

METHOD FOR THE MUTUAL AUTHENTICATION OF ENTITIES HAVING PREVIOUSLY INITIATED AN ONLINE TRANSACTION

CROSS-REFERENCE TO RELATED APPLICATIONS

This application is a U.S. National Stage application of International Application No. PCT/FR2012/052678 filed on Nov. 20, 2012, and claims priority to French Patent Application No. 1160891 filed Nov. 29, 2011.

BACKGROUND OF THE INVENTION

The invention relates to the field of on-line transactions. The invention relates in particular to authenticating parties to a transaction that has been initiated on-line, when the parties meet in order to finalize the transaction.

A transaction between two persons, e.g. selling goods or a service, may take place in two stages: during a first stage, the transaction is initiated on-line. The parties communicate via a telecommunications network in order to agree on the goods or service, on a sale price, and on a rendezvous to make the exchange. Thereafter, during a second stage, the persons meet and exchange the agreed goods or service for payment of the price.

During such a transaction, it is not possible to be sure that the person attending the rendezvous is indeed the person who initiated the on-line transaction. A third party may thus to attempt to usurp the identity of one of the parties.

It is known to make use of a delivery code in order to enable the purchaser of goods to be authenticated. During a first on-line stage of the transaction, the seller provides the purchaser with a delivery code. On delivery, the purchaser presents the received delivery code in order to authenticate his- or her-self and obtain the goods.

Nevertheless, it remains desirable to improve the security of a transaction initiated on-line.

OBJECT AND SUMMARY OF THE INVENTION

The present invention proposes an authentication method for enabling authentication to be performed between a first entity and a second entity, the method comprising:
  during a first stage in which a first entity communicates with a second entity via a telecommunications network:
    a step of generating a first token; and
    a step of transmitting the first token to the second entity; and
  during a second stage, a step of authenticating a first non-authenticated entity as being the second entity as a function of a second token contained in a first portable electronic device of the first non-authenticated entity.
This method is remarkable in that it comprises:
  during the first stage:
    a step of generating a third token; and
    a step of transmitting the third token to the first entity; and
  during the second stage, a step of authenticating a second non-authenticated entity as being the first entity as a function of a fourth token contained in a second portable electronic device of the second non-authenticated entity.

By means of these characteristics, the invention enables authentication to be performed mutually between the first and second entities, e.g. between two persons, during the second stage. In other words, the invention provides a mutual authentication protocol.

During the first stage, which may correspond to initiating a transaction on-line, the two entities exchange a first token and a third token. During the second stage, and in the absence of any attempt at usurping identity, the second token corresponds to the first token and the fourth token corresponds to the third token. The third and fourth tokens thus make it possible to verify that the entities who meet during the second stage are the entities who participated in the first stage.

The invention finds a particular application during a transaction relating to a service. Under such circumstances, it is not possible to authenticate one of the parties to the transaction by presenting any goods. Mutual authentication is thus particularly advantageous.

Preferably, the step of generating the first token comprises using a cryptographic algorithm to generate the first token as a function of data relating to a transaction between the first entity and the second entity and as a function of a secret key of the first entity, and the step of generating the third token comprises using a cryptographic algorithm to generate the third token as a function of the data and as a function of a secret key of the second entity.

The use of a cryptographic algorithm together with keys for generating the exchanged tokens makes any attempt at usurping identity more difficult for a third party.

In an implementation, the key of the first entity is a secret key, the first token being generated by encrypting the data with the key of the first entity, and the key of the second entity is a secret key, the third token being generated by encrypting the data with the key of the second entity.

In another implementation, the key of the first entity is a secret key, the first token being generated by signing the data with the key of the first entity, and the key of the second entity is a secret key, the third token being generated by signing the data with the key of the second entity.

In another implementation, the key of the first entity is a bi-asymmetric key including a private key and a public key, the first token being generated by signing the data with the public key of the first entity, and the key of the second entity is a bi-asymmetric key including a private key and a public key, the third token being generated by signing the data with the public key of the second entity.

In an implementation, the step of authenticating a first non-authenticated entity as being the second entity comprises:
  a step of the first portable electronic device receiving the second token; and
  a step of the first portable electronic device verifying the authenticity of the second token by using the private key of the first entity; and
  the step of authenticating a second non-authenticated entity as being the first entity comprises:
  a step of the second portable electronic device receiving the fourth token; and
  a step of the second portable electronic device verifying the authenticity of the fourth token by using the private key of the second entity.

In an implementation, the step of verifying the authenticity of the second token comprises decrypting the second token with the private key of the first entity, and the step of verifying the authenticity of the fourth token comprises decrypting the fourth token with the private key of the second entity.

In an implementation, the step of verifying the authenticity of the second token comprises comparing the second token with a first predetermined signature, and the step of verifying the authenticity of the fourth token comprises decrypting the fourth token with a second predetermined signature.

In an implementation, the step of verifying the authenticity of the second token comprises comparing the second token with a first signature determined by using the private key of the first entity, and the step of verifying the authenticity of the fourth token comprises decrypting the fourth token with a second signature determined by using the private key of the second entity.

In an implementation, each of the first and second portable electronic devices includes a communications interface for providing short-range communication, i.e. communication over a range of 5 centimeters (cm) to 300 meters (m), between the first portable electronic device and the second portable electronic device, with the step of the second portable electronic device receiving the second token, and the step of the first portable electronic device receiving the fourth token comprising an exchange of tokens by said short-range communication.

In another implementation, the step of authenticating a first non-authenticated entity as being the second entity comprises:
 a step of the second portable electronic device receiving a first code; and
 a step of the second portable electronic device verifying the authenticity of the fourth token by using the first code; and
the step of authenticating a second non-authenticated entity as being the first entity comprises:
 a step of the first portable electronic device receiving a second code; and
 a step of the first portable electronic device verifying the authenticity of the second token by using the second code.

The first code may be the key of the second entity and the second code may be the key of the first entity.

In a variant, the step of verifying the authenticity of the fourth token may comprise the second portable electronic device determining the key of the second entity as a function of the first code, and the step of verifying the authenticity of the second token may comprise the first portable electronic device determining the key of the first entity as a function of the second code.

The step of generating a first token may be performed by a first electronic device of the first entity, said first electronic device and the second portable electronic device being two distinct devices. Likewise, the step of generating a third token may be performed by a second electronic device of the second entity, said second electronic device and the first portable electronic device being two distinct devices.

Conversely, the step of generating a first token may be performed by the second portable electronic device of the first entity, and the step of generating a third token may be performed by the first portable electronic device of the second entity.

This enables each entity to perform the transaction with two electronic devices that are separate, or with a single device. The tokens may also be generated by a server.

In corresponding manner, the invention proposes an authentication system for enabling authentication between a first entity and a second entity, the system comprising:
 means for generating a first token;
 means for transmitting the first token to the second entity via a telecommunications network; and
 means for authenticating a first non-authenticated entity as being the second entity as a function of a second token contained in the first portable electronic device of the first non-authenticated entity;
the system being characterized in that it comprises:
 means for generating a third token;
 means for transmitting the third token to the first entity via the telecommunications network; and
 means for authenticating a second non-authenticated entity as being the first entity as a function of a fourth token contained in a second portable electronic device of the second non-authenticated entity.

In an embodiment, each of the first and second, portable electronic devices includes a communications interface enabling short-range communication, i.e. in the range 5 cm to 300 m, between the first portable electronic device and the second portable electronic device.

BRIEF DESCRIPTION OF THE DRAWINGS

Other characteristics and advantages of the present invention appear from the following description made with reference to the accompanying drawings which show an implementation having no limiting character. In the figures.

DETAILED DESCRIPTION OF IMPLEMENTATIONS

Figure 1:
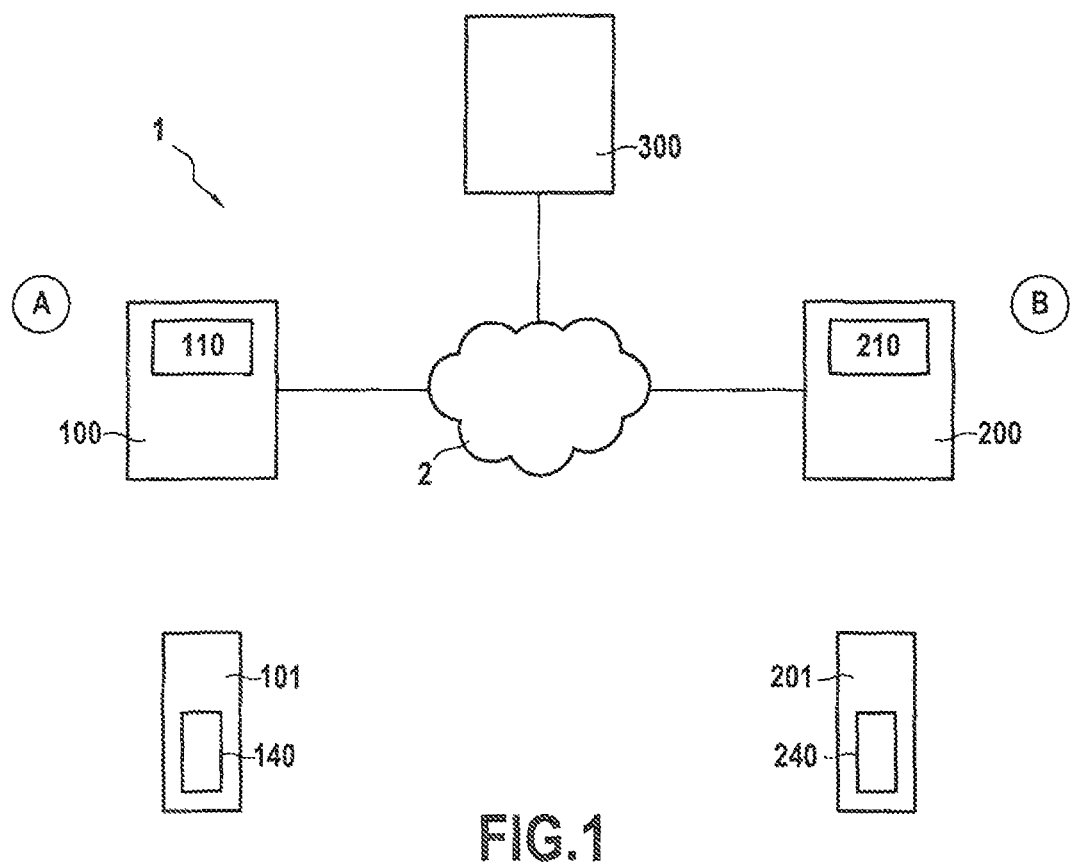
FIG. 1 shows a system enabling the invention to be performed.

FIG. 1 shows a system 1 for performing a transaction between two persons given respective references A and B.

The system 1 comprises a personal computer 100 and a portable terminal 101 (e.g. a mobile telephone) belonging to the person A, a personal computer 200, and a portable terminal 201 (e.g. a mobile telephone) belonging to the person B, a server 300 of a service provider, and a telecommunications network 2.

By way of example, the telecommunications network 2 is the Internet and it enables the personal computer 100, the personal computer 200, and the server 300 to communicate with one another.

Figure 2:
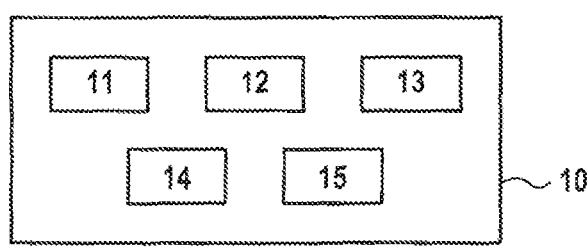
FIG. 2 shows the hardware architecture of an electronic device of the FIG. 1 system.

FIG. 2 shows the hardware architecture of an electronic device 10 of the FIG. 1 system. The electronic device 10 may be the personal computer 100, the portable terminal 101, the personal computer 200, or the portable terminal 201.

The electronic device 10 has the hardware architecture of a computer and comprises a processor 11, a non-volatile memory 12, a volatile memory 13, a first communications interface 14, and a second communications interface 15.

The processor 11 serves to execute computer programs stored in the non-volatile memory 12 while using the volatile memory 13. Below, while describing the operation of the personal computer 100, of the portable terminal 101, of the personal computer 200, or of the portable terminal 201, it should be understood that this operation may be the result of executing such a computer program. Such programs may be programs for managing keys, and programs for generating and verifying tokens used during a transaction between the entity A and the entity B.

With a personal computer 100 or 200, the communications interface 14 enables communication to be performed remotely via the telecommunications network 2, and the communications interface 15 enables communication to be performed at short range with the portable terminal 101 or 201.

By way of example, with a portable terminal 101 or 201, the communications interface 14 serves to communicate remotely via a cellular telephone network or mobile telephony, and the communications interface 15 provides short-range communication, i.e. over a distance of a few centimeters to a few meters, with another terminal situated nearby. By way of example, the communications interface 15 uses a communications protocol such as Bluetooth, NFC, . . . .

The portable devices 101 and 201 can communicate with each other and with the server 300 via the communications interface 14, e.g. by the short-message service (SMS) and mobile Internet, and in complementary manner, they can also communicate via the communications interface 15.

FIG. 1 also shows a secret key 110 of the person A, which key is stored in the memory of the personal computer 100 (non-volatile memory 12 and/or volatile memory 13), a secret key 210 of the person B, which key is stored in the memory of the personal computer 200 (non-volatile memory 12 and/or volatile memory 13), the memory 140 of the portable terminal 101 (non-volatile memory 12 and/or volatile memory 13), and the memory 240 of the portable terminal 201 (non-volatile memory 12 and/or volatile memory 13). The key 110 is also stored in the memory 140, and the key 210 is also stored in the memory 240.

The conduct of a transaction between the person A and the person B in the system of FIG. 1 is described below.

Figure 3:
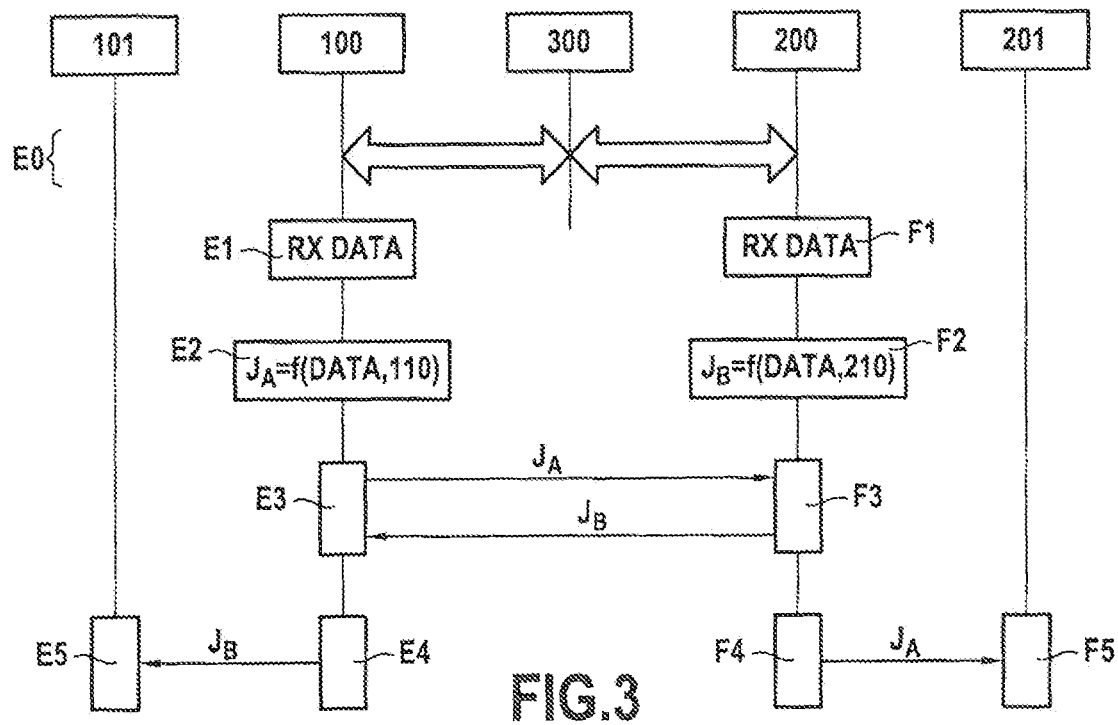
FIG. 3 shows the conduct of a first stage of an authentication method in accordance with the invention in the FIG. 1 system.

FIG. 3 shows a first stage of the transaction, enabling an on-line transaction to be initiated.

During a step E0, the personal computer 100 and the personal computer 200 communicate with the server 300 in order to initiate a transaction. The communication between the personal computer 100, the personal computer 200, and the server 300 passes via the telecommunications network 2. In other words, the transaction is initiated on-line.

By way of example, the server 300 is a server of a service provider such as a site for selling goods or a service on-line, a meeting site, . . . . Initiating the transaction may consist for example in agreeing on goods or a service, a price, and a rendezvous.

Thus, at the end of step E0, the personal computer 100 obtains data DATA relating to the transaction (step E1). By way of example, the data DATA contains the identity of the person A, the identity of the person B, the description of goods or of a service, a price, and a rendezvous (place, date, and time), and possibly also an identification number for the transaction. In corresponding manner, at the end of step E0, the personal computer 200 obtains data DATA relating to the transaction (step F1).

Thereafter, in step E2, the personal computer 100 generates a token $J_A$ as a function of the data DATA and of the key 110. By way of example, the token $J_A$ is generated by a cryptographic algorithm as a function of the data DATA and of the key 110. The cryptographic algorithm used makes it impossible for a third party, even a third party knowing the data DATA, to generate the token $J_A$ without also knowing the key 110. The key 110 may be a static key (usable several times over by A), or it may be an ephemeral key, i.e. usable solely for the transaction currently taking place (mutual authentication with B). In an implementation, it may be deduced from a secret code or personal identification number (PIN) selected by A and/or generated by the personal computer 100 and/or generated by the server 300, using a cryptographic algorithm (e.g. an SHA-1 hashing function as described in FIPS 180-3). In another implementation, the key 110 might be used only after A has presented a secret code (PIN) protecting use of the key. Under such circumstances, the secret code serves to unblock the functions of generating and verifying tokens.

In corresponding manner, in step F2, the personal computer 200 generates a token $J_B$ as a function of the data DATA and of the key 210. By way of example, the token $J_B$ is generated by a cryptographic algorithm as a function of the data DATA and of the key 210. The cryptographic algorithm used makes it impossible for a third party, even a third party knowing the data DATA, to generate the token $J_B$ without also knowing the key 210. The key 210 may be a static key (usable several times over by B), or it may be an ephemeral key, i.e. usable solely for the transaction currently taking place (mutual authentication with A). In an implementation, it may be deduced from a secret code or personal identification number (PIN) selected by B and/or by the personal computer 200 and/or generated by the server 300, using a cryptographic algorithm (e.g. an SHA-1 hashing function as described in FIPS 180-3). In another implementation, the key 210 might be used only after B has presented a secret code (PIN) protecting use of the key. Under such circumstances, the secret code serves to unblock the functions of generating and verifying tokens.

Thereafter, the personal computers 100 and 200 exchange the tokens $J_A$ and $J_B$ that have been generated by means of the telecommunications network 2 (steps E3 and F3).

The personal computer 100 then transmits the received token $J_B$ to the portable terminal 101 (step E4), which stores it in its memory 140 (step E5). In corresponding manner, the personal computer 200 then transmits the received token $J_A$ to the portable terminal 201 (step F4), which stores it in its memory 240 (step F5).

Alternatively, the server 300 possesses the data DATA and the keys, and it generates the tokens $J_A$ and $J_B$. Under such circumstances, the personal computer 100 or the portable device 101 receives the token $J_B$, the key 110, and the data DATA, and the personal computer 200 or the portable device 201 receives the token $J_A$, the key 210, and the data DATA.

At the end of this first stage, the persons A and B have thus agreed a rendezvous to exchange the goods or the service. Furthermore, in the portable terminal 101 or 201, each person has a token $J_A$ or $J_B$ generated as a function of the secret key of the other person.

Figure 4:
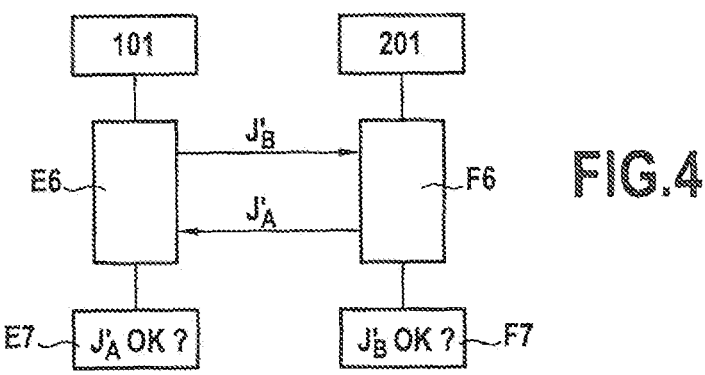
FIG. 4 shows the conduct of a second stage in the authentication method.

FIG. 4 shows a second stage of the transaction, during which the persons A and B meet at the rendezvous that has been set and they authenticate each other mutually in order to finalize the transaction.

During this rendezvous, the person A is accompanied by the portable terminal 101 and the person B by the portable terminal 201.

Since the persons A and B are those who participated in the first stage of FIG. 3, the memory 140 of the portable terminal 101 contains in particular the token $J_B$ received during step E5, while the memory 240 of the portable terminal 201 contains in particular the token $J_A$ received in step F5. Nevertheless, in the event of an attempt at usurping identity, a third party could go to the rendezvous with a portable terminal that stores some unspecified token and pretend to be A or B.

Thus, in FIG. 4, the tokens stored in the portable terminals of the persons who meet are written $J_A'$ and $J_B'$. Normally, the tokens $J_A'$ and $J_B'$ correspond to the tokens $J_A$ and $J_B$, however in the event of an attempt at usurping identity, one of the two tokens might be different.

The persons A and B meeting makes it possible to establish short-range communication between the portable terminals 101 and 201 via their communications interfaces 15. Thus, in steps E6 and F6, the portable terminals exchange the stored tokens $J_A'$ and $J_B'$.

Thereafter, in step E7, the portable terminal 101 verifies the authenticity of the token $J_A'$ received in step E6 by using the key 110 of the person A and a cryptographic algorithm complementary to the algorithm used in step E2. The key 110 may be pre-stored in the portable terminal 101 or it may be transmitted together with the token $J_B$ during the step E4.

If it is indeed the person B who is attending the rendezvous and transmitting the token $J_A'$, then the token $J_A'$ does indeed correspond to the token $J_A$. In contrast, if a third party attends the rendezvous and transmits the token $J_A'$, then the token $J_A'$ does not correspond to the token $J_A$. As explained above, the cryptographic algorithm used in step E2 makes it impossible for a third party, even a third party knowing the data DATA, to generate the token $J_A$ without also knowing the secret key 110 of the person A. Verifying the authenticity of the token $J_A'$ thus enables the person A to authenticate the other person attending the rendezvous as indeed being the person B.

In corresponding manner, in step F7, the portable terminal 201 verifies the authenticity of the token $J_B'$ received in step F6 by using the key 210 of the person B and a cryptographic algorithm complementary to the algorithm used in step F2. The key 210 may be pre-stored in the portable terminal 201 or it may be transmitted together with the token $J_A$ during the step F4.

If it is indeed the person A who is attending the rendezvous and transmitting the token $J_B'$, then the token $J_B'$ does indeed correspond to the token $J_B$. In contrast, if a third party attends the rendezvous and transmits the token $J_B'$, then the token $J_B'$ does not correspond to the token $J_B$. As explained above, the cryptographic algorithm used in step F2 makes it impossible for a third party, even a third party knowing the data DATA, to generate the token $J_B$ without also knowing the secret key 210 of the person A. Verifying the authenticity of the token $J_B'$ thus enables the person B to authenticate the other person attending the rendezvous as indeed being the person A.

After steps E7 and F7, the persons A and B are mutually authenticated and can thus finish off the transaction in complete safety, e.g. by exchanging the agreed goods or service for its price.

Non-limiting examples of implementations of mechanisms for constructing and verifying the authentication token are described below.

The authentication token may be calculated using a cryptographic algorithm based on a secret key. Under such circumstances, it may be a data signature (message authentication code (MAC)). During step E3 (or step F3), the device 100 (or 200) constructs the token $J_A$ (or $J_B$) by signing the data DATA characterizing the transaction, possibly together with other data (public or secret) with the help of the key 110 (or 210). Under such circumstances, during the step E6 (or F6), the device 101 (or 201) constructs the expected signature on the basis of the data DATA characterizing the transaction, possibly accompanied by other data (public or secret), with the help of the key 110 (or 210), and then compares it in E7 (or F7) with $J_A'$ (or $J_B'$).

Another implementation using a cryptographic algorithm based on the secret key may involve encrypting the data. During step E3 (or F3), the device 100 (or 200) constructs the token $J_A$ (or $J_B$) by encrypting the data DATA characterizing the transaction, possibly together with a secret key known only to A (or B) with the help of the key 110 (or 210). Under such circumstances, during the step E6 (or F6), the device 101 (or 201) decrypts the token $J_A'$ (or $J_B'$) with the help of the key 110 (or 210), and in step E7 (or F7) verifies that the data as decrypted is indeed the expected data.

Another implementation using a cryptographic algorithm based on an asymmetric key may involve encrypting the data. Under such circumstances, the key 110 (or 210) is a bi-asymmetric key (private key and public key). During the step E3 (or F3), the device 100 (or 200) constructs the token $J_A$ (or $J_B$) by encrypting the data DATA characterizing the transaction, possibly together with a secret known only to A (or B) with the help of the public key 110 (or 210). Under such circumstances, during the step E6 (or F6), the device 101 (or 201) decrypts the token $J_A'$ (or $J_B'$) with the help of the private key 110 (or 210), and in step E7 (or F7) verifies that the data as decrypted is indeed the expected data.

The asymmetric aspect of the protocol makes it possible to use only one of the two keys at each step of the protocol. Thus, the key 110 (or 210) contained in the personal computer 100 (or 200) must itself contain at least the public key of the bi-asymmetric key, while the key 110 contained in the portable terminal 101 (or 201) must contain at least the private key of the bi-asymmetric key. In this implementation, it is possible to enable a plurality of entities or persons to conclude a transaction on-line (i.e. perform the stage 1) in the name of A (or B), each possessing the same public key associated with A (or B), while only A (or B) who possesses the corresponding private key can be authenticated at the rendezvous and can thus conclude the transaction (stage 2). This enables A (or B) to delegate on-line preparation of the transaction to a third party, whereas only A (or B) in person can actually conclude the on-line transaction (face to face).

The person skilled in the art will understand that the above-described implementations and variants merely constitute non-limiting examples of how the invention can be performed. In particular, the person skilled in the art could envisage any combination of the above-described variants and implementations in order to satisfy some particular need.

Figure 5:
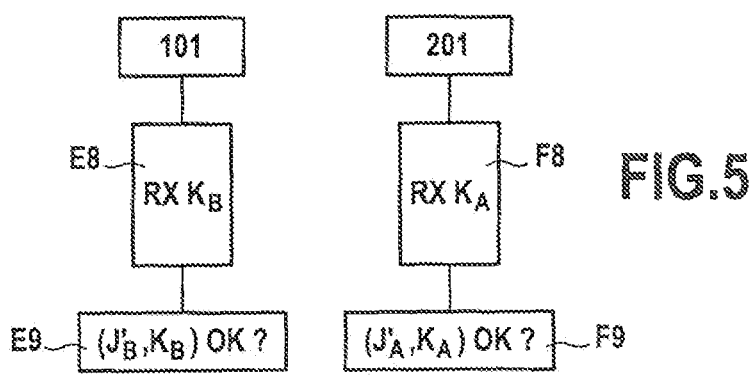
FIG. 5 shows the conduct of the second stage of the authentication method in a variant.

FIG. 5 shows a variant of the conduct of the second stage.

As in FIG. 4, during the second stage of the transaction, the persons A and B meet at the rendezvous that has been agreed and they authenticate each other mutually in order to finalize the transaction. During the rendezvous, person A has the portable terminal 101 and person B has the portable terminal 201. As above, the tokens that are stored in the portable terminals of the persons who meet are written $J_A'$ and $J_B'$. The tokens $J_A'$ and $J_B'$ should normally correspond to the tokens $J_A$ and $J_B$ of FIG. 3, however at least one of them may be different in the event of an attempt at usurping identity.

In step E8, the person A presents the portable terminal 101 to the person B who then inserts a code $K_B$ into the portable terminal 101, e.g. by using an input interface of the terminal 101. The code $K_B$ may either be the verification cryptographic key of B (i.e. 210), or else data (PIN) enabling the portable terminal 101 to reconstruct the verification cryptographic key 210 of B (e.g. with the help of an SHA-1 hashing function, as described in FIPS 180-3).

Thereafter, in step E9, the portable terminal 101 verifies the authenticity of the token $J_B'$ contained in its memory using the code $K_B$.

If it is indeed the person B who is attending the rendezvous and who inserts the code $K_B$, then the code $K_B$ corresponds to the token $J_B'$ stored in the memory 140 of the terminal 101. In contrast, if it is a third party that is attending the rendezvous and who inserts some arbitrary code $K_B$, then the code $K_B$ does not correspond to the token $J_B'$ stored in the memory 140 of the terminal 101. Verifying that the token $J_B'$ corresponds to the code $K_B$ thus enables the person A to authenticate the other person attending the rendezvous as indeed being the person B. Once A has verified the result of the match between $K_B$ and $J_B'$ as performed by the terminal 101 (e.g. by means of a screen display), that person has authenticated B.

In corresponding manner, in step F8, the person B presents the portable terminal 201 to the person A who then inserts the a code $K_A$ into the portable terminal 201, e.g. by using an input interface of the terminal 201. The code $K_A$ may either be the verification cryptographic key of A (i.e. 110), or else data (PIN) enabling the portable terminal 201 to reconstruct the verification cryptographic key 110 of A (e.g. with the help of an SHA-1 hashing function, as described in FIPS 180-3).

Thereafter, in step F9, the portable terminal 201 verifies the authenticity of the token $J_A'$ contained in its memory using the code $K_A$.

If it is indeed the person A who is attending the rendezvous and who inserts the code $K_A$, then the code $K_A$ corresponds to the token $J_A'$ stored in the memory 140 of the terminal 101. In contrast, if it is a third party that is attending the rendezvous and who inserts some arbitrary code $K_A$, then the code $K_A$ does not correspond to the token $J_A'$ stored in the memory 240 of the portable terminal 201. Verifying that the token $J_A'$ corresponds to the code $K_A$ thus enables the person B to authenticate the other person attending the rendezvous as indeed being the person A. Once B has verified the result of the match between $K_A$ and $J_A'$ as performed by the terminal 201 (e.g. by means of a screen display), that person has authenticated A.

Thus, after steps E9 and F9, the persons A and B have mutually authenticated each other and can thus finalize the transaction in complete security, e.g. by exchanging the agreed goods or service for its price.

In the system 1 of FIG. 1, the transaction is initiated on-line by means of a server 300. In a variant, the persons A and B initiate the transaction by direct communication between the personal computers 100 and 200 without the intermediary of a server.

In the system 1 of FIG. 1, the person A has a personal computer 100 and a portable terminal 101. In a variant, the person A uses a single portable electronic device that performs the functions of the personal computer 100 and of the portable terminal 101. Under such circumstances, operation is substantially the same as that described above, only the step E4 of transmission between the personal computer 100 and the portable terminal 101 being unnecessary. In corresponding manner, the person B may use a single portable electronic device to perform the functions of the personal computer 200 and of the portable terminal 201.

In an implementation, the use of the key 110 by the portable terminal 101 and/or the personal computer 100 can take place only if the person A has input an identification code, e.g. a PIN number, into the portable terminal 101 in order to authorize use of the key 110. In corresponding manner, in an implementation, the use of the key 210 by the portable terminal 201 and/or the personal computer 200 can take place only if the person B inputs an identification code, e.g. a PIN number, into the portable terminal 201 in order to authorize use of the key 210. In the invention, during the first stage, the tokens may be transmitted in secure manner by email or by SMS.

The invention claimed is:

1. An authentication method for enabling authentication to be performed between a first portable electronic device of a first entity and a second portable electronic device of a second entity, the first portable electronic device comprising:
   a processor; and
   a memory coupled to the processor, the memory storing instructions, which when executed by the processor, cause the processor to perform operations comprising:
      during a first stage in which the first portable electronic device of the first entity communicates with the second portable electronic device of the second entity via a telecommunications network:
         generating, by the first portable electronic device, a first digital cryptographic token; and
         transmitting the first digital cryptographic token from the first portable electronic device to the second portable electronic device of the second entity; and
      during a second stage, authenticating a first non-authenticated entity as being the second entity as a function of a second digital cryptographic token received from the second portable electronic device and stored in the memory of the first portable electronic device corresponding to the first digital cryptographic token;
   wherein the operations further comprise:
      during the first stage:
         receiving, via the telecommunications network, at the first portable electronic device, a third digital cryptographic token generated by the second portable electronic device; and
      during the second stage, transmitting a fourth digital cryptographic token from the first portable electronic device to the second portable electronic device, wherein when the fourth digital cryptographic token is received, a second non-authenticated entity is authenticated as being the first entity as a function of the fourth digital cryptographic token stored in a memory of the second portable electronic device corresponding to the third digital cryptographic token.

2. An authentication method according to claim 1, wherein generating the first digital cryptographic token comprises using a cryptographic algorithm to generate the first digital cryptographic token as a function of data relating to a transaction between the first entity and the second entity and as a function of a key of the first entity stored in the memory of the first portable electronic device, and third digital cryptographic token having been generated by the second portable electronic device using a cryptographic algorithm to generate the third digital cryptographic token as a function of the data and as a function of a key of the second entity stored in the memory of the second portable electronic device.

3. An authentication method according to claim 2, wherein the key of the first entity is a secret key, the first digital cryptographic token being generated by encrypting the data with the key of the first entity, and the key of the second entity is a secret key, the third digital cryptographic token being generated by encrypting the data with the key of the second entity.

4. An authentication method according to claim 2, wherein the key of the first entity is a secret key, the first digital cryptographic token being generated by signing the data with the key of the first entity, and the key of the second entity is a secret key, the third digital cryptographic token being generated by signing the data with the key of the second entity.

5. An authentication method according to claim 2, wherein the key of the first entity is a bi-asymmetric key including a private key of the first entity and a public key of the first entity, the first digital cryptographic token being generated by the first portable electronic device signing the data with the public key of the first entity, and the key of the second entity is a bi-asymmetric key including a private key of the second entity and a public key of the second entity, the third digital cryptographic token having been generated by the second portable electronic device signing the data with the public key of the second entity.

6. An authentication method according to claim 5, wherein authenticating the first non-authenticated entity as being the second entity comprises:
receiving, from the second portable electronic device, the second digital cryptographic token; and
verifying the authenticity of the second digital cryptographic token by using the private key of the first entity; and
wherein the second stage further comprises:
transmitting, from the first portable electronic device, to the second portable electronic device, the fourth digital cryptographic token; and wherein when the fourth digital cryptographic token is received, the authenticity of the fourth digital cryptographic token is verified by using the private key of the second entity.

7. An authentication method according to claim 3, wherein the authentication comprises:
receiving, by the first portable electronic device, the second digital cryptographic token; and
verifying, by the first portable electronic device, the authenticity of second digital cryptographic token by using the key of the first entity; and
receiving, by the second portable electronic device, the fourth digital cryptographic token; and
verifying, by the second portable electronic device, the authenticity of the fourth digital cryptographic token by using the key of the second entity;
wherein the verifying, by the first portable electronic device, the authenticity of the second digital cryptographic token comprises decrypting the second digital cryptographic token with the key of the first entity, and the verifying, by the second portable electronic device, the authenticity of the fourth digital cryptographic token comprises decrypting the fourth digital cryptographic token with the key of the second entity.

8. An authentication method according to claim 4, further comprising:
receiving, by the first portable electronic device, the second digital cryptographic token; and
verifying, by the first portable electronic device, the authenticity of the second digital cryptographic token by using the key of the first entity; and
receiving, by the second portable electronic device, the fourth digital cryptographic token; and
verifying, by the second portable electronic device, the authenticity of the fourth digital cryptographic token by using the key of the second entity;
wherein the verifying, by the first portable electronic device, the authenticity of the second digital cryptographic token comprises comparing the second digital cryptographic token with a first predetermined signature, and the verifying, by the second portable electronic device, the authenticity of the fourth digital cryptographic token comprises decrypting the fourth digital cryptographic token with a second predetermined signature.

9. An authentication method according to claim 5, wherein authenticating the first non-authenticated entity as being the second entity comprises:
receiving, from the second portable electronic device, the second digital cryptographic token; and
verifying the authenticity of the second digital cryptographic token by using the private key of the first entity; and
wherein the second stage further comprises:
transmitting, from the first portable electronic device, to the second portable electronic device, the fourth digital cryptographic token; and wherein when the fourth digital cryptographic token is received, the authenticity of the fourth digital cryptographic token is verified by using the private key of the second entity;
wherein verifying the authenticity of the second digital cryptographic token further comprises comparing the second digital cryptographic token with a first signature determined by using the private key of the first entity, and wherein when the fourth digital cryptographic token is received, the authenticity of the fourth digital cryptographic token is verified by decrypting the fourth digital cryptographic token with a second signature determined by using the private key of the second entity.

10. An authentication method according to claim 6, wherein each of the first and second portable electronic devices further comprise a communications interface for providing short-range communication between the first portable electronic device and the second portable electronic device, wherein transmitting the first digital cryptographic token to the second portable electronic device, receiving the second digital cryptographic token, the first portable electronic device receiving the third digital cryptographic token, and transmitting the fourth digital cryptographic token to the second portable electronic device comprise exchanging tokens by said short-range communication.

11. An authentication method according to claim 1, wherein the first authentication comprises:
receiving, by the second portable electronic device, a first code; and
verifying, by the second portable electronic device, the authenticity of the fourth digital cryptographic token by using the first code; and
receiving, by the first portable electronic device, a second code; and
verifying, by the first portable electronic device, the authenticity of the second digital cryptographic token by using the second code.

12. An authentication method according to claim 11, wherein the generating the first digital cryptographic token comprises using a cryptographic algorithm to generate the first digital cryptographic token as a function of data relating to a transaction between the first entity and the second entity and as a function of a key of the first entity; and the generating the third digital cryptographic token comprises using a cryptographic algorithm to generate the third digital cryptographic token as a function of the data and as a function of a key of the second entity;

wherein the first code is the key of the second entity and the second code is the key of the first entity.

13. An authentication method according to claim 11, wherein the generating the first digital cryptographic token comprises using a cryptographic algorithm to generate the first digital cryptographic token as a function of data relating to a transaction between the first entity and the second entity and as a function of a key of the first entity; and the generating the third digital cryptographic token comprises using a cryptographic algorithm to generate the third digital cryptographic token as a function of the data and as a function of a key of the second entity;

wherein the verifying the authenticity of the fourth digital cryptographic token comprises the second portable electronic device determining the key of the second entity as a function of the first code, and the verifying the authenticity of the second digital cryptographic token comprises the first portable electronic device determining the key of the first entity as a function of the second code.

14. An authentication system for enabling authentication between a first entity and a second entity, the system comprising a first portable electronic device of the first entity and a second portable electronic device of the second entity, the first portable electronic device comprising:

a processor; and a memory coupled to the processor, the memory storing instructions, which when executed by the processor, cause the processor to perform operations comprising:

generating, by the first portable electronic device, a first digital cryptographic token;

transmitting the first digital cryptographic token from the first portable electronic device to the second portable electronic device of the second entity via a telecommunications network;

authenticating a first non-authenticated entity as being the second entity as a function of a second digital cryptographic token received from the second portable electronic device and stored in the memory of the first portable electronic device corresponding to the first digital cryptographic token;

receiving, at the first portable electronic device, a third digital cryptographic token generated by the second portable electronic device and transmitted to the first portable electronic device of the first entity via the telecommunications network; and transmitting a fourth digital cryptographic token from the first portable electronic device to the second portable electronic device, wherein when the fourth digital cryptographic token is received, a second non-authenticated entity is authenticated as being the first entity as a function of the fourth digital cryptographic token stored in a memory of the second portable electronic device corresponding to the third digital cryptographic token.

15. An authentication system according to claim 14, wherein each of the first and second portable electronic devices includes a communications interface enabling short-range communication between the first portable electronic device and the second portable electronic device.

* * * * *